ELECTRICAL EQUIPMENT FOR CODING INTELLIGENCE

Filed April 7, 1965 3 Sheets-Sheet 1

Inventors:
HAYDN VICTOR PURDY
RONALD CAMPBELL McINTOSH

By Darby, Robertson & Vandenburgh
Attorneys

Dec. 19, 1967 H. V. PURDY ETAL 3,358,816

ELECTRICAL EQUIPMENT FOR CODING INTELLIGENCE

Filed April 7, 1965 3 Sheets-Sheet 2

Inventors:

HAYDN VICTOR PURDY
RONALD CAMPBELL McINTOSH

By Davis Robertson Vandenburgh
Attorneys

Dec. 19, 1967 H. V. PURDY ET AL 3,358,816

ELECTRICAL EQUIPMENT FOR CODING INTELLIGENCE

Filed April 7, 1965 3 Sheets-Sheet 3

Inventors:

HAYDN VICTOR PURDY
RONALD CAMPBELL McINTOSH

By Dauber Robertson & Vandenburgh
Attorneys

United States Patent Office 3,358,816
Patented Dec. 19, 1967

3,358,816
ELECTRICAL EQUIPMENT FOR CODING INTELLIGENCE

Haydn Victor Purdy, 30 Fontenoy Road, London, England, and Ronald Campbell McIntosh, Skimpans, Welham Green, England Filed Apr. 7, 1965, Ser. No. 446,285
Claims priority, application Great Britain, Apr. 10, 1964, 15,027/64
7 Claims. (Cl. 199—1)

Figure 1:
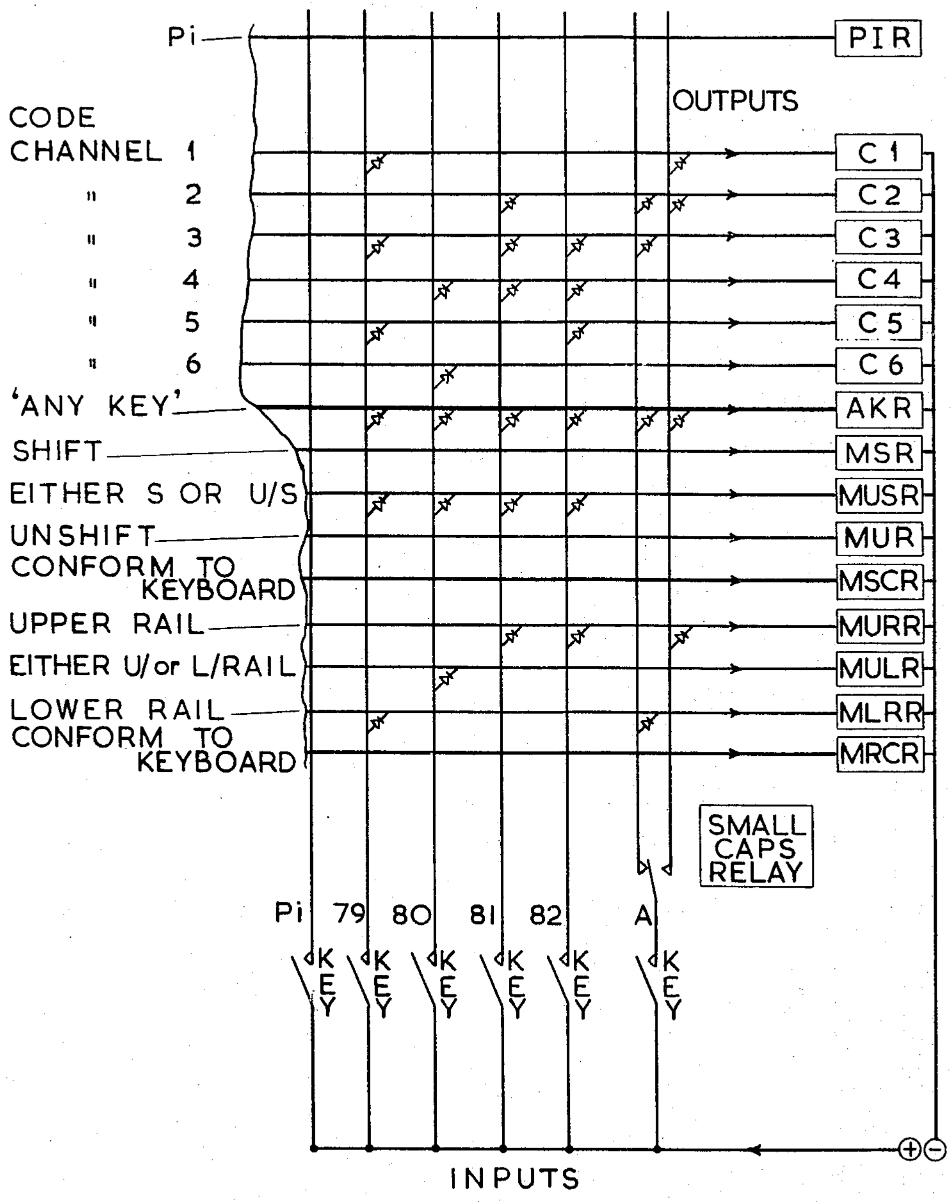

This invention relates to the production of coded intelligence by keyboard operation wherein character codes are interspersed with function codes such as Shift and Unshift, Upper Rail, and Lower Rail, in the production of punched tapes for typesetting, for example.

The invention has been developed in connection with the production of coded intelligence for the eventual control of printing type setting operations, for example, so-called T.T.S. or Teletypesetter (a trademark) operations. Such intelligence is recorded on punched tape or other record, which is later used to control the setting of the type for printing purposes.

The invention could also be used for the production of intelligence for other purposes wherein a basic pattern of intelligence has to be varied in accordance with certain secondary considerations, such as the production of machine tool operating programs, and certain types of computer programs.

Keyboard machines for typesetting control purposes are usually arranged for the interpolation of instruction codes such as Shift, Unshift, Upper Rail, Lower Rail, which affect the printing layout.

In conventional machines, all such instruction codes are produced as the direct result of a manual operation on the keyboard and omission of any one such manual operation will invalidate all succeeding coded intelligence.

Because of magazine restrictions in the actual typesetting machines to be controlled by the coded keyboard information, characters of the same alphabet are allocated to different cases, and to different rails, and the need to interpolate control codes is not always a logical requirement resulting, for example, from a change of alphabet, but is in a number of cases an arbitrary change which has no logical printing reason, and requires memorizing as such by the operator. The use of such arbitrary allocations also results in the need to interpolate control codes on occasion, such as shift and unshift, both before and after a single character code.

All these matters complicate conventional keyboard operation, restrict its speed, and render it more liable to faulty operation.

It is the object of the present invention to reduce the load on the operator's memory and reduce the number of control operations the operator is required to make when coding copy.

As at present envisaged the invention comprises the principle of automatically comparing the current governing factor out of a plurality of alternative governing factors which can govern the production of coded intelligence with that one of said alternative factors which is to govern a succeeding item of intelligence, and automatically to replace the current governing factor by the succeeding governing factor if and only if the succeeding governing factor differs from the current governing factor. The current governing factor is applied to a control stage in the coding equipment.

In a subsidiary aspect, a plurality of control stages may be individually controllable each by a selected factor from a corresponding set from a plurality of complementary sets of governing factors.

It will be understood that the principles enunciated above are applicable in many types of industrial systems and equipments, and the invention includes the application of the novel principles set out herein in all circumstances to which they are applicable.

Figure 2:
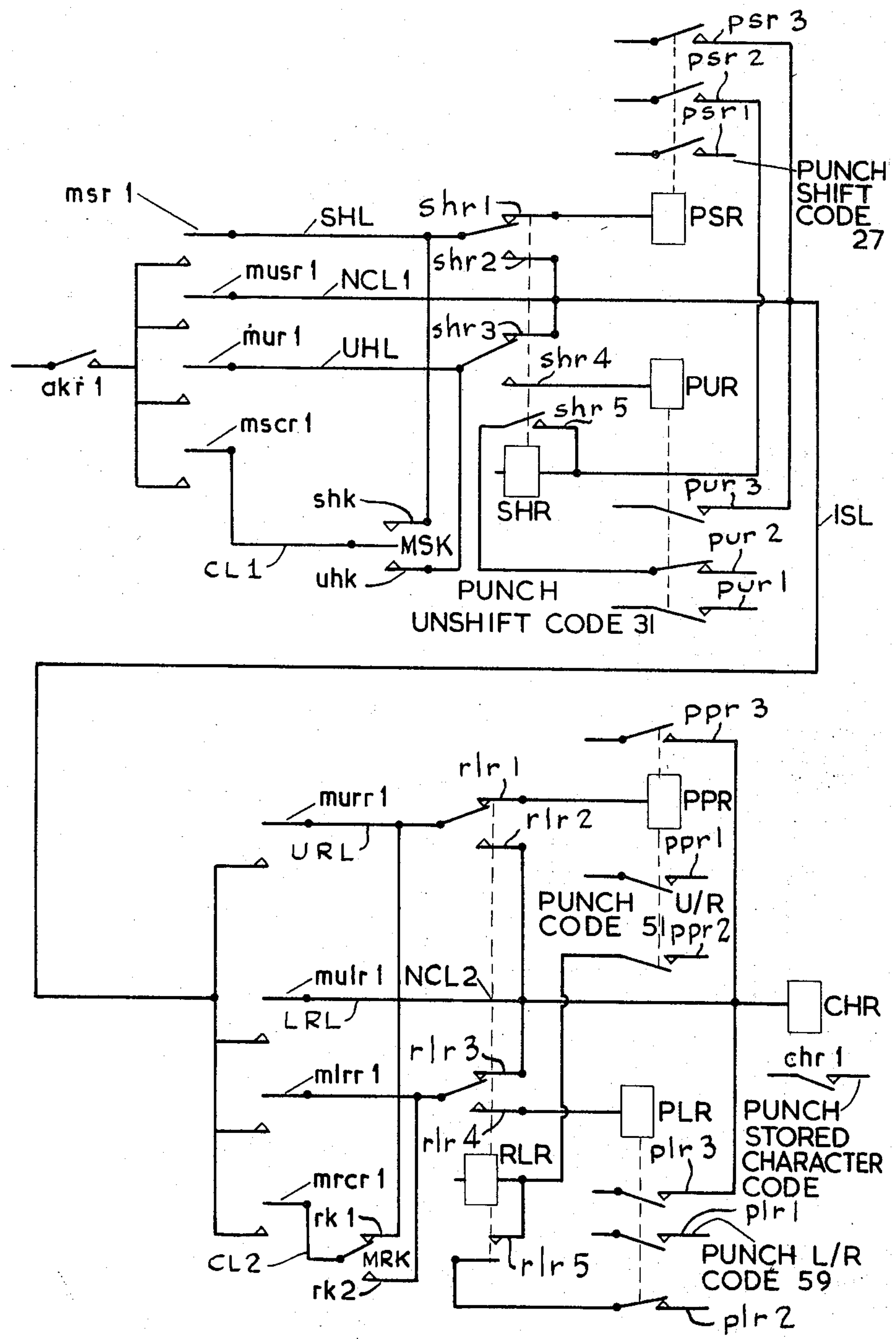
Figure 3:
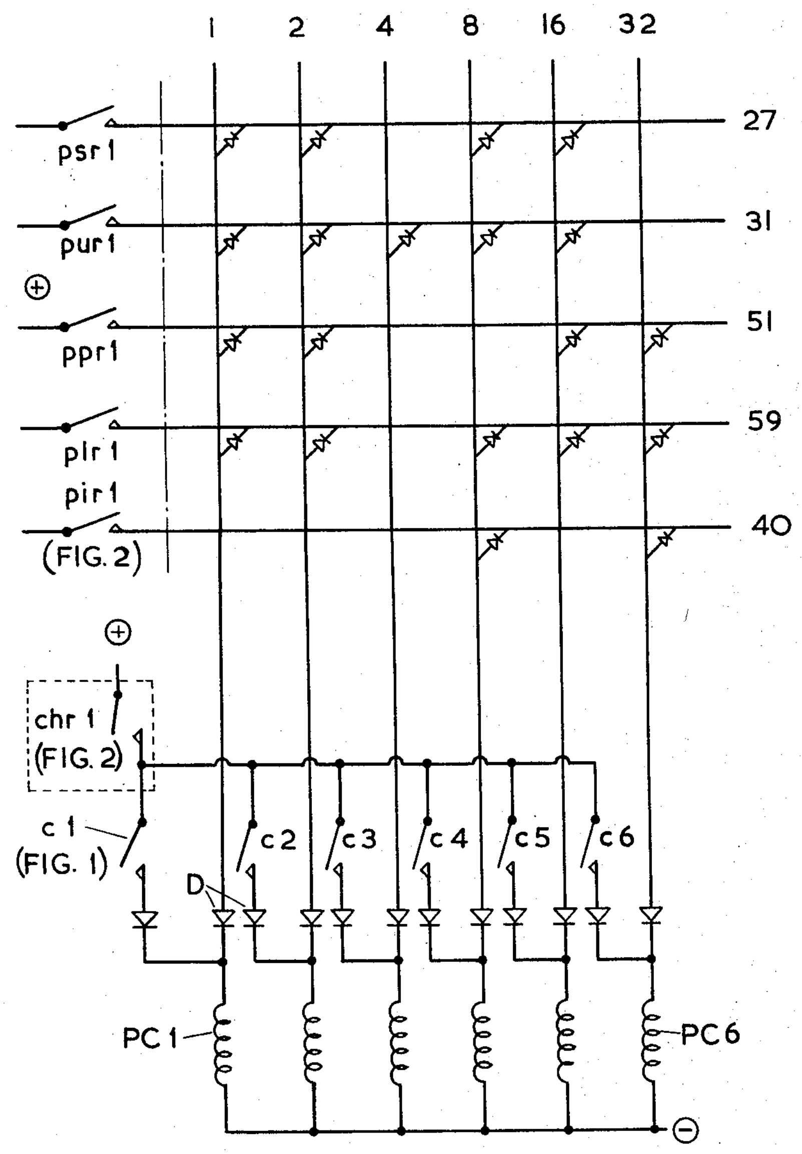

The invention will be described with reference to an embodiment relating to the production of punched tape for controlling typesetting shown in the accompanying drawings in which:

FIG. 1 shows a diode matrix for generating character code records and function records from keyboard operation, FIG. 2 shows a two-stage control circuit for automatically determining what function codes, if any, are to be punched with each character code, while FIG. 3 shows a diode matrix for controlling tape punches under control of the character and function code-determining equipment shown in FIGS. 1 and 2.

As already stated, in conventional typesetting-code recording machines, each functional machine change required to be made by the typesetting machine to set copy being coded is individually coded as a direct result of operating a corresponding function key or switch.

The allocation of character positions in the coequal Shift/Upper Rail; Unshift/Upper Rail; Shift/Lower Rail; Unshift/Lower Rail groups in typesetting machines is of necessity arbitrary for a number of special characters in order to utilize all character positions, because there are not coequal character groups each of like size and style fitting tidily into the channel groups. In consequence, some Copy sequences involve a considerable number of functional changes; even including function changes between successive pairs of characters. This increases the number of keys to be operated, and the functional changes to be memorized by the Operator.

The printing character vocabulary normally includes four types of letter characters: both small letters and capital letters in the Roman and Italic styles respectively. These are accommodated one in each of the four typesetting rail groups listed above. However, for Operator convenience and for keeping the keyboard area within limits, each letter has a single key which is to be used for whichever character format of the letter concerned is required, the function condition of the machine providing the desired differentiation.

Only one type of digit is provided and therefore there is one key for each individual digit character. This also applies to a number of special characters.

Some of these one-per-key characters are allocated only one rail-position; others are allocated two related rail positions so that they can be used without function changes with, for example, both Roman and Italic alphabets; yet others are allocated to four rail positions, one in each of the four rails, so that they are available whatever individuals rail is currently selected for use.

These variations in character availability in typesetting machines are utilized in the present invention in reducing the number of key-operations to be made in a typesetter coding machine.

Since the rail selections are superimposed on the character key selections, it is possible to allocate the same character code to characters appearing in different typesetting rails up to a maximum of four. By taking advantage of this possibility it is possible to utilize a six-bit binary code to identify all characters and functions in a coding machine.

Thus, each group of four Roman and Italic aspects of a letter are given the same 6-unit binary code value. The fifth letter aspect, namely Small Capitals or S/C must be given different treatment, and they are paired with other characters for allocation of a single code value.

When a single code value is used for only two characters, or for one character only, the availability of the characters concerned in relation to the typesetting machine functions can be increased.

The Function keys are still required, and the fully-loaded code value—one which is used for four characters—must still be qualified by function conditions to the same extent as before. However, interpretation of the lightly-loaded 6-bit code values can be automated to an extent determined by the extent of loading.

The respective availabilities of the characters are incorporated in an expanded binary code the individual values of which are derived from the operation of the respective character keys and which are used to determine how many and what 6-bit code values are to be derived and recorded for use in controlling a typesetting machine.

The 6-bit code is expanded into a 14-bit code which is given an additional bit which is always "1" to indicate the generation of all expanded code values. The extra code-bits are divided between Shift allocations and Rail allocations. The characters allocated to fully-loaded four-character codes must always conform to the specific conditions set up on the keyboard; i.e., Shift or Unshift; Lower Rail or Upper Rail. A character which appears in both rails of Shift or Unshift can have its code recorded irrespective of the current rail condition, recorded by the keyboard.

A character having appearances in both rails of both Shift and Unshift can have its code recorded whatever Shift and Rail conditions are current. To identify these varying availabilities, the extra bits identify from a Shift point of view: Conform—for the four-aspect letters, which have an aspect in all four rails and must always follow the conditions set up by the keyboard. Either, for characters which are available in both Shift and Unshift in the typesetting machine; Shift and Unshift respectively for characters which appear in one such location only; from a rail point of view within the shift positions: Conform, as above; either, as above; Lower Rail or Upper Rail for a character only available in one or the other.

The expanded codes are derived from keyboard operation by a diode matrix, FIG. 1 which has an "X" horizontal code channel per code bit, the Output of each terminating in an electrical ON-OFF device such as electromagnetic relay, of the reed type for example; a tube; a valve; or a solid-state device, and a vertical Y channel, or two channels, per key. The Keys, FIG. 1, are respectively connected at one side to Input connections commoned to a positive D.C. supply. A key has only one Y channel, e.g. Pi; 79; 80; 81; 82, providing it represents no more than four character aspects all having the same 6-bit code value, but an additional channel is required when the key is utilized for character aspects requiring different 6-bit code values: this is the case with letters which have five aspects: Roman Small; Roman Capital; Italic Small; Italic Capital; and Small Capitals. Small Capitals have different 6-bit code values from the other four aspects of the same letter, and the Small Capitals function key, in addition to bringing Upper Rail into current use, also switches, as indicated for Y channel A, the 26 letter key circuits from their normal Y channels in the matrix, by operating a Small Caps Relay, to 26 other Y channels each of which is connected in accordance with the Small Capitals code value of the alphabet.

Each Y channel of the matrix is connected in conventional fashion by individual diodes to a selection of X channels corresponding to its expanded code value so that the operation of any character key connects potential to its code selection of channels to operate corresponding code and function relays connected to said channels.

The six character code relays are C1–C6, FIG. 1, in addition to which there is an ANY KEY relay AKR which is connected to every Y channel. The function relays are: the Matrix Shift relay MSR connected to the Shift X channel; the Matrix Unshift relay MUR connected to the Unshift X channel; the Matrix "Either Shift or Unshift" relay MUSR; the Matrix Shift Conform relay MSCR; and the Matrix Upper Rail Relay MURR; the Matrix Lower Rail Relay MLRR; the Matrix "Either Upper or Lower Rail" Relay MULR; and the Matrix Rail Conform Relay MRCR.

The function relays control the automatic function-control circuit of FIG. 2. This circuit is in two serial stages which control the Shift condition and the Rail Style respectively. The stages are generally similar to one another.

The first shift control stage is triggered by potential applied to its input via a front contact *akr* 1 of the ANY key relay AKR, FIG. 1, whereas the input to the second Rail control stage is via an Interstage lead ISL from the Shift control stage.

In each case the input is multipled to four individual make contacts *msr* 1, *musr* 1, *mur* 1, *mscr* 1 controlled by the four Matrix Shift Condition relays MSR, MUSR, MUR, MSCR in FIG. 1, and *murr* 1, *mulr* 1, *mlrr* 1, *mrcr* 1 controlled by the four Matrix Rail Condition relays MURR, MULR, MLRR, MRCR.

The Conform lead CL 1 passes from contacts *mscr* 1 to change-over contacts of a manual Shift Key MSK on the Keyboard, whose fixed contacts *shk*, *uhk* are connected respectively to the Shift lead SHL from *msr* 1 and the Unshift lead UHL from *mur* 1, so that according to the setting of the Shift Key MSK, a Conform signal is directed to the lead corresponding to the condition currently set up on the Keyboard. The Shift and Unshift leads SHL, UHL also pass to change-over contacts *shr* 1, *shr* 2, *shr* 3 and *shr* 4 of a shift relay SHR which contacts are shown in the Unshift condition. Contacts *musr* 1 are connected by lead NCL 1 to the second stage.

Contact *shr* 1 is connected to a Punch Shift relay PSR; contacts *shr* 2 and *shr* 3 are both connected to an interstage lead ISL; while contacts *shr* 4 are connected to a Punch Unshift relay PUR. Contacts *psr* 1, *pur* 1 of relays PSR, PUR control the punching by Punch Shift Code 28 and Punch Unshift Code 31; their contacts *psr* 2, *pur* 2 control the operation of relay SHR; while their contacts *psr* 3, *pur* 3 control interstage signalling via lead ISL.

Lead ISL is multipled to Rail code relay contacts *murr* 1, *mulr* 1, *mlrr* 1, and *mrcr* 1. Matrix Rail Conform relay contacts *mrcr* 1 are connected via CL 2 to the change-over of key MRK. The back contact *rk* 1 of Key MRK is connected to the Upper Rail Lead URL, while its front contact *rk* 2 is connected to the Lower Rail Lead LRL. Matrix Lower Rail relay contacts *mlrr* 1 are connected via lead LRL to the change-over contact of relay RLR which moves between fixed contacts *rlr* 3, *rlr* 4.

Matrix Upper or Lower Rail relay contacts *mulr* 1 are connected via lead NCL 2 to relay CHR.

Matrix Upper Rail Relay contacts *murr* 1 are connected to the change-over contact of relay RLR which moves between contacts *rlr* 1, *rlr* 2.

Contact *rlr* 1 is connected to Upper Rail Code relay PPR. Contacts *rlr* 2, *rlr* 3 are both connected via lead NCL 2 to relay CHR. Contact *rlr* 4 is connected to Lower Rail Code Relay PLR.

Contacts *ppr* 1, *plr* 1, of relay PPR, PLR control the punching of the Punch Upper Rail (U/R) Code 51, and the Punch Lower Rail (L/R) Code 59, respectively.

Contacts *ppr* 2 control the operation of relay RLR while normally-open contacts *rlr* 5 act as self-locking contacts for relay RLR via normally-closed contacts *plr* 2. Normally-open relay contacts *ppr* 3 and *plr* 3 are both connected via lead NCL 2, to relay CHR the function of which is to initiate punching of the 6-bit character code recorded on the code relays C1 . . . C6 in conventional manner.

It will be seen that the Condition Switches MSK, MRK perform no direct function but are ancillary to the Conform code relays MSCR, MRCR for automatically controlling the setting of relays PSR, PUR, and relays PPR, PLR.

The purpose of relay SHR is to minimize the punching of the function codes. Thus, if relay PSR is energized to punch Shift code, its front contacts psr 2 energize relay SHR which locks via the back contacts pur 2 of PUR.

In this condition any further order via lead SHL is not directed to PSR but direct to lead ISL so that no further punching of the Shift code is made until after relay SHR has been released.

However, when an Unshift order is received via lead UHL while relay SHR is energized and its change-over contacts are in their lower position, the relay PUR is operated, so that the Unshift code is punched via contacts pur 1, and relay SHR is released by the opening of contacts pur 2.

If the manual shift key MSK is operated to open contacts uhk and close contacts shk, there is no direct result but when an order is received via SHL or via mscr 1, shk; relay PSR will be operated to punch the Shift code via its contacts psr 1. Thus the Shift and Unshift codes, and in a similar manner the Upper Rail and Lower Rail codes are only punched when a *change* of code is to be made.

The function codes are generated in binary notation 1, 2, 4, 8, 16, 32 via a function code diode matrix shown in FIG. 3 and are applied to the six punch operating coils PC1–PC6 in parallel with leads from contacts C1 . . . C6 of the relays C1 . . . C6, FIG. 1. Feedback from one of each pair of connected leads to the other of the pair is prevented by inserting a diode D in each lead, polarized as shown.

The "Punch" relay contacts psr 1, pur 1, ppr 1, plr 1, together with pir 1 discussed below, are shown in FIG. 3 controlling the operation of the respective punch operating coils PC 1 . . . PC 6 via the matrix, for codes 28, 31, 51, 59 and 40 respectively.

It will be seen that according to the existing conditions within and applied to each stage of FIG. 2, one or two function codes may at times be generated in response to operation of a character key. Usually no function codes will be required and the final relay CHR, FIG. 2, will be operated by a direct circuit from contacts akr 1 via No-Code lead NCL 1, lead ISL, and No-Code lead NCL 2.

Contacts chr 1 of relay CHR, FIG. 2, are also shown in FIG. 3.

If there is no through circuit in either (a) the first stage, or (b) the second stage, or (c) both, then (a) one of relays PSR, PUR, or (b) one of relays PPR, PLR, or (c) one relay from each pair will be operated in turn. In each case, relay CHR will be operated; either (a) via front contacts psr 3 or pur 3, lead ISL, and through a circuit in the second stage; or (b) and (c), via front contacts ppr 3 of relay PPR, or front contacts plr 3 of relay PLR.

In the various conditions enumerated, either the character code alone, or a shift code followed by the character code; or a rail code followed by the character code; or a shift code followed by a rail code followed by the character code, will be punched.

The determination of the function codes to be punched is always automatically or semi-automatically made, and the number of function codes to be punched in recording a piece of copy is reduced to the essential minimum.

Although a 14-bit expanded code is mentioned above, it may be desirable to add bits controlling additional functions or governing factors, e.g.

(1) A parity bit for T.T.S. code (present or not: to give even number of bits).

(2) A parity bit for the expanded code (present or not: to indicate failure of internal circuitry of the keyboard, with or without feedback from circuitry of punch).

(3) "Add-code" bit such as to sample a relay or diode matrix after completion of above described logic and punching cycle, giving for instance facility of adding pi (stop) code to a coded character not available in the typesetter magazine. This is indicated in FIGS. 1 and 3 by means of a relay PIR and its contacts pir 1.

It will be seen that the keyboard constitutes a signal generator for generating first-order functional electrical signals consisting of character codes characterizing respective first-order functions, and second-order functional electrical signals consisting of function codes characterizing respective second-order functions.

The punch coils PC 1 . . . PC 6, FIG. 3, and their control circuits constitute Program Recording Equipment.

The circuits of FIG. 2 include:

FIRST storage apparatus; relays PSR, PUR, PPR, PLR, for storing the identity of the last second order signal inserted in a program.

Second storage apparatus; relays MSR, MUSR, MUR, MSCR, MURR, MULR, MLRR, MRCR: for storing in turn each second order signal received from the signal generator, Signal transfer apparatus; relay contact tree circuits feeding respectively relays PSR, PUR: and PPR, RLR, FIG. 2; for transferring a signal stored in said second storage apparatus to said program recording equipment, Comparator equipment, relays SHR, RLR, FIG. 2 and associated circuits; for comparing the contents of said first and second storage apparatus prior to recording each first order signal, and Order equipment; contacts of relays SHR, RLR and circuits for first storage apparatus controlled thereby; under control of said comparator equipment for ordering said transfer apparatus to transfer the second order signal in said second storage apparatus to said program recording equipment if the comparator equipment determines that the signals compared are incompatible.

The system includes:

A first set of recording relays; MSR, MUR, MURR, MLRR: for recording the identities of individual second order functions corresponding to manual keys, A second set of recording relays; MSCR, MRCR: for recording the identities of groups of second order functions corresponding to manual keys.

A third set of recording relays; SHR, RLR: for recording the identities of individual second order functions currently exercizing program control, Comparator circuits; e.g. circuit akr 1, msr 1 or mur 1; shr 1 or 2; shr 3 or 4; relay PSR or PUR; for comparing settings of relays of said first and third sets to determine whether a particular second order function is currently in control, and Comparator circuits; e.g. mscr 1, MSK, shr 1, 2 and shr 3, 4, relays PSR, PUR; for comparing the settings of relays of said second and third sets to determine whether one of a respective group of second order functions is currently in control.

As employed herein the terms "front" and "back" pertaining to the contacts merely refer to whether the contacts are closed by energzing the relay or by deenergizing the relay.

What we claim is:

1. An automatic program-coding system comprising: a signal generator for generating series of first-order functional electrical signals interspersed with second-order functional electrical signals; program recording equipment; first storage apparatus for storing the identity of the last second order signal inserted into a program; second storage apparatus for storing in turn each second-order signal received from said signal generator; signal transfer apparatus for transferring a signal stored in said second storage apparatus to said program recording equipment; comparator equipment for comparing the contents of said first and second storage apparatus prior to recording each first order signal; and order equipment under control of said comparator equipment for ordering said transfer apparatus to transfer the second order signal in said second storage apparatus to said program recording equipment if the comparator equipment determines that the signals compared are incompatible.

2. An automatic program coding system according to claim 1, wherein said signal generator comprises: manual keys and associated signalling equipment for first order function signals only; manual keys and associated signalling equipment for first order function signals and associated second order function signals; and manual keys and associated signalling equipment for second order function signals only.

3. An automatic program coding system according to claim 1, wherein said comparator comprises: circuits for determining whether a particular single second order function, or a particular one of a plurality of second order functions, is currently acting as a controlling program function.

4. An automatic program coding system according to claim 1, wherein said comparator comprises: a first set of circuits for determining whether a single second order function, or one of a plurality of second order functions of a first group of second order functions in conjunction with a second set of circuits for determining whether a single second order function, or one of a plurality of second order functions of a second group of second order functions, are currently acting as complementary controlling program functions.

5. An automatic program coding system according to claim 3 and comprising: a first set of recording relays for recording the identities of individual second order functions corresponding to manual keys; a second set of recording relays for recording the identities of groups of second order functions corresponding to manual keys; a third set of recording relays for recording the identities of individual second order functions currently exercising program control; comparator circuits for comparing the settings of relays of said first and third sets to determine whether a particular second order function is currently in control; and comparator circuits for comparing the settings of relays of said second and third sets to determine whether one of a respective group of second order functions is currently in control.

6. An automatic program coding system for page printing comprising: character keys, Shift and Rail keys, a coordinate selective matrix controlled by the character keys for operating a selection of relays for storing a set of character identity elements and a selection of relays for storing a set of Shift and Rail condition elements, which sets together form a multi-element binary code, and comparator equipment incorporating Shift and Rail Key Position Switches, relays for recording individual Shift and Rail conditions which are currently in control, and recording devices for recording individual Shift and Rail conditions to be inserted in a program.

7. An automatic program coding system according to claim 6 and comprising: relays for temporarily storing the individual Shift and Rail conditions to be inserted in a program a coordinate selective matrix controlled independently by said character storage relays, and a set of program recording devices connected to the output leads of said matrix.

References Cited

UNITED STATES PATENTS

| | | | |
|---|---|---|---|
| 2,873,837 | 2/1959 | Clark | 197—20 |
| 2,905,298 | 9/1959 | Blodgett et al. | 197—20 |

ROBERT E. PULFREY, *Primary Examiner.*

W. F. McCARTHY, E. T. WRIGHT, *Assistant Examiners.*